(12) United States Patent
Takagi

(10) Patent No.: US 9,869,925 B2
(45) Date of Patent: Jan. 16, 2018

(54) LIGHT SOURCE DEVICE, ILLUMINATION DEVICE, AND PROJECTOR

(71) Applicant: SEIKO EPSON CORPORATION, Tokyo (JP)

(72) Inventor: Chigusa Takagi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/203,062

(22) Filed: Jul. 6, 2016

(65) Prior Publication Data

US 2017/0017143 A1 Jan. 19, 2017

(30) Foreign Application Priority Data

Jul. 16, 2015 (JP) ................. 2015-141929

(51) Int. Cl.
*G03B 21/20* (2006.01)
*H04N 9/31* (2006.01)
*F21V 19/00* (2006.01)
*G03B 21/16* (2006.01)

(52) U.S. Cl.
CPC ............ *G03B 21/16* (2013.01); *F21V 19/003* (2013.01); *G03B 21/2013* (2013.01); *G03B 21/2033* (2013.01); *H04N 9/3161* (2013.01); *H04N 9/3164* (2013.01); *G03B 21/204* (2013.01)

(58) Field of Classification Search
CPC .......... G03B 21/2013; G03B 21/20133; G03B 21/204; H04N 9/3161; H04N 9/3164; F21V 19/003; F21V 21/00

USPC ........... 353/94; 362/249.01, 249.02, 249.06, 362/249.07, 249.14
See application file for complete search history.

(56) References Cited

U.S. PATENT DOCUMENTS

| | | | | |
|---|---|---|---|---|
| 2011/0122373 | A1* | 5/2011 | Kaseya | ................. G03B 21/28 353/37 |
| 2011/0249460 | A1 | 10/2011 | Kushimoto | |
| 2012/0002173 | A1* | 1/2012 | Akiyama | ........... G03B 21/2013 353/30 |
| 2013/0070215 | A1* | 3/2013 | Higo | .................... G03B 21/204 353/85 |
| 2014/0313715 | A1 | 10/2014 | Matsuo et al. | |

FOREIGN PATENT DOCUMENTS

| | | |
|---|---|---|
| JP | 2011-222238 A | 11/2011 |
| JP | 2012-151035 A | 8/2012 |
| JP | 2014-192450 A | 10/2014 |
| JP | 2015-038958 A | 2/2015 |

* cited by examiner

*Primary Examiner* — Ryan Howard
(74) *Attorney, Agent, or Firm* — Oliff PLC

(57) ABSTRACT

A light source device includes: a plurality of light-emitting elements including a first light-emitting element and a second light-emitting element each of which emits light in a first direction; and a base material including a base portion that extends in a second direction inclined with respect to the first direction. The plurality of light-emitting elements are disposed along the second direction on one side of the base portion.

20 Claims, 7 Drawing Sheets

LIGHT SOURCE DEVICE, ILLUMINATION DEVICE, AND PROJECTOR

BACKGROUND

1. Technical Field

The present invention relates to a light source device, an illumination device, and a projector.

2. Related Art

In the related art, a light source device using a light-emitting element such as a semiconductor laser is proposed. Moreover, in order to respond to a request for higher luminance as alight source device for a projector or the like, a light source device including a plurality of semiconductor lasers is proposed (e.g., see JP-A-2015-38958).

The light source device disclosed in JP-A-2015-38958 includes a plurality of semiconductor laser devices and a holding member.

Each of the semiconductor laser devices includes: a semiconductor laser element; a placing body on which the semiconductor laser element is mounted; a substrate on which the placing body is biased to one side thereof; and a pair of terminals electrically connected to the semiconductor laser element, biased to the other side of the substrate, and protruding from the substrate. The holding member includes: holes aligned in at least a pair of rows; a thin-walled section on which the holes are arranged, the thin-walled section being formed by providing at least a pair of depressions on the other side; and a thick-walled section provided adjacent to the thin-walled section. The semiconductor laser device is mounted on one side, each placing body is disposed on the thick-walled section, and the pair of terminals are exposed through the holes from the other side.

In the technique disclosed in JP-A-2015-38958, however, there is a problem in that it is difficult to increase the arrangement density of semiconductor laser elements, that is, it is difficult to miniaturize the light source device. Moreover, even if the arrangement density of semiconductor laser elements can be increased by any means, heat-generating portions are arranged at a high density, and thus there is a problem in that the temperature of the light source device is likely to rise.

SUMMARY

An advantage of some aspects of the invention is to solve at least a part of the problems described above, and the invention can be implemented as the following modes or application examples.

APPLICATION EXAMPLE 1

A light source device according to this application example includes: a plurality of light-emitting elements including a first light-emitting element and a second light-emitting element each of which emits light in a first direction; and a base material including a base portion that extends in a second direction inclined with respect to the first direction, wherein the plurality of light-emitting elements are disposed along the second direction on one side of the base portion.

According to this configuration, the light source device includes the plurality of light-emitting elements, and therefore can emit light of high luminance.

Moreover, since the plurality of light-emitting elements are disposed on the base material described above, the arrangement density of the plurality of light-emitting elements can be made lower than the density of a plurality of light beams emitted from the plurality of light-emitting elements in a cross-section perpendicular to the first direction. Thus, since the heat generated by the plurality of light-emitting elements can be efficiently discharged through the base material, it is possible to provide the light source device with reduced temperature rise and improved lifetime.

APPLICATION EXAMPLE 2

In the light source device according to the application example, it is preferable that the base material includes a plurality of projecting portions including a first projecting portion and a second projecting portion that project from the one side of the base portion, that the first light-emitting element is provided on the first projecting portion, and that the second light-emitting element is provided on the second projecting portion.

According to this configuration, it is possible to easily realize a configuration in which the plurality of light-emitting elements are disposed along the second direction on the one side of the base portion and each of the light-emitting elements emits light in the first direction.

APPLICATION EXAMPLE 3

In the light source device according to the application example, it is preferable that the light source device further includes a collimating lens that collimates the light emitted by the first light-emitting element.

According to this configuration, the light emitted by the first light-emitting element can be effectively used.

APPLICATION EXAMPLE 4

In the light source device according to the application example, it is preferable that the base material further includes a restricting portion that projects from the one side of the base portion and restricts movement of the collimating lens to the base portion side.

According to this configuration, since the collimating lens can be easily disposed at a predetermined position in one direction of the directions orthogonal to the first direction, the manufacture of the light source device can be simplified.

APPLICATION EXAMPLE 5

In the light source device according to the application example, it is preferable that the light source device further includes a heat-receiving portion that is provided on the other side of the base portion and receives heat of the base portion.

According to this configuration, the light source device can efficiently dissipate the heat generated by the plurality of light-emitting elements and conducted to the base portion. Thus, it is possible to further reduce the temperature rise and suppress degradation in the light source device. Moreover, the plurality of light-emitting elements can be disposed at a higher density. Further, it is possible to provide the light source device in which the light-emitting elements emitting light of higher luminance is mounted.

APPLICATION EXAMPLE 6

In the light source device according to the application example, it is preferable that the base portion includes a heat-dissipating surface on which the heat-receiving portion is disposed, and that the heat-dissipating surface is parallel to the second direction.

According to this configuration, the light-emitting elements disposed along the second direction are located at approximately the same distance to the heat-dissipating surface. Due to this, since the heat is approximately equally conducted from the light-emitting elements to the heat-receiving portion, the temperature rise of the light-emitting elements can be reduced with a small variation.

APPLICATION EXAMPLE 7

In the light source device according to the application example, it is preferable that the base material includes a base material main body and a temperature buffer member that is disposed between the base material main body and the first light-emitting element, and that the temperature buffer member has a thermal expansion coefficient between a thermal expansion coefficient of the light-emitting element and a thermal expansion coefficient of the base material main body.

According to this configuration, even when the base material main body is formed of a member having a high thermal conductivity, that is, a member having a favorable heat-dissipating property, a stress between the light-emitting element and the base material main body due to a change in shape caused by heat generation can be relaxed by the temperature buffer member. Thus, the light-emitting element can be stably disposed on the base material.

APPLICATION EXAMPLE 8

An illumination device according to this application example includes: the light source device described above; and a phosphor that is excited by light emitted from the light source device and emits visible light.

According to this configuration, since the illumination device includes the light source device described above, it is possible to illuminate an object to be illuminated with high luminance for a long period of time or to miniaturize the illumination device.

APPLICATION EXAMPLE 9

A projector according to this application example includes: the light source device described above; a light modulator that modulates light emitted from the light source device; and a projection optical device that projects the light modulated by the light modulator.

According to this configuration, since the projector includes the light source device described above, it is possible to stably project a bright image or to miniaturize the projector.

APPLICATION EXAMPLE 10

A projector according to this application example includes: the illumination device described above; a light modulator that modulates light emitted from the illumination device; and a projection optical device that projects the light modulated by the light modulator.

According to this configuration, since the projector includes the illumination device described above, it is possible to stably project a bright image or to miniaturize the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
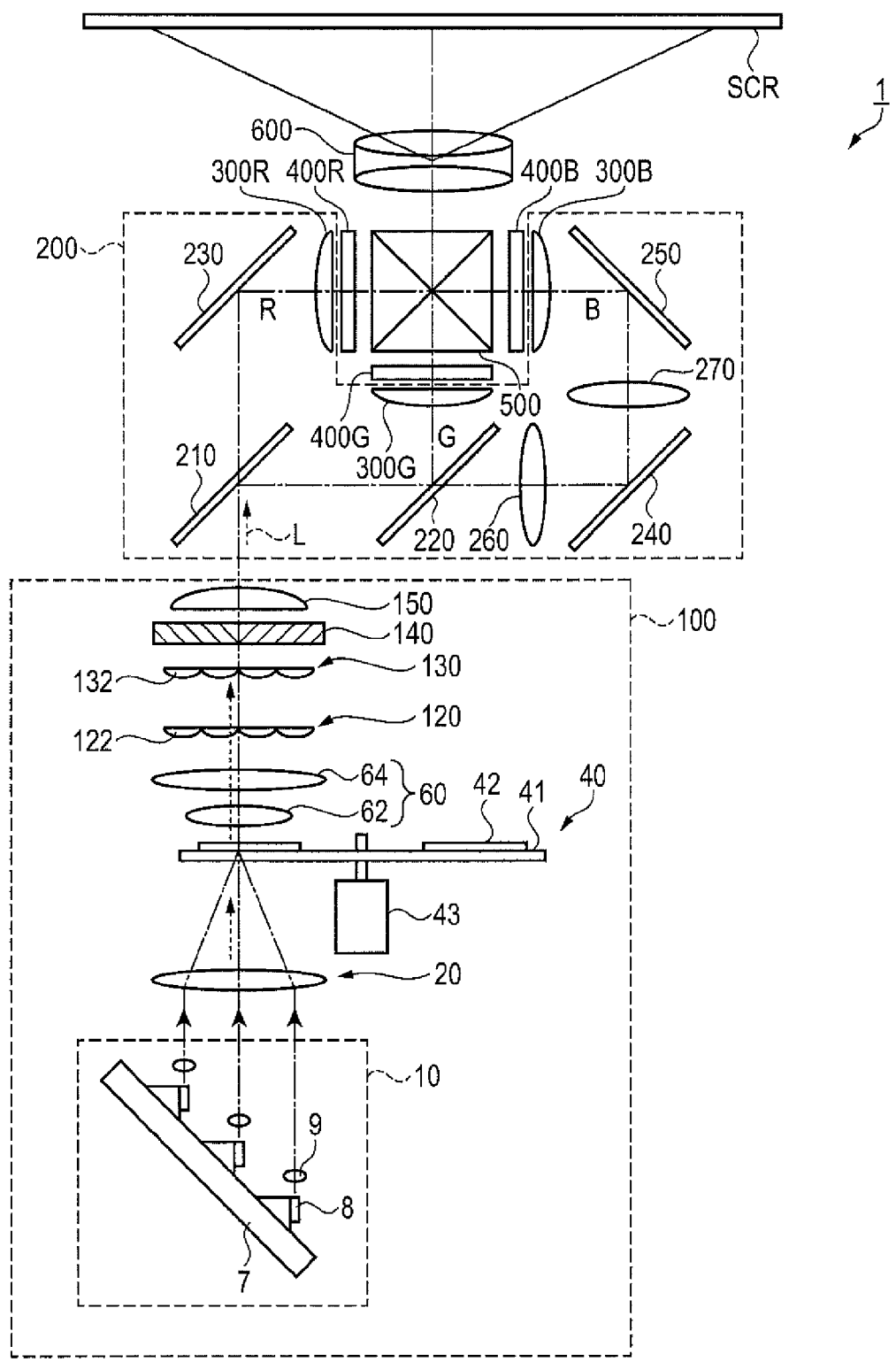
FIG. 1 is a schematic view showing an optical system of a projector according to a first embodiment.

Hereinafter, a light source device, an illumination device, and a projector according to a first embodiment will be described with reference to the drawings. In the drawings shown below, dimensions and ratios of components are appropriately different from actual ones in order to show the components in sizes recognizable on the drawings.

Main Configuration of Projector

FIG. 1 is a schematic view showing an optical system of a projector 1 according to the embodiment.

As shown in FIG. 1, the optical system of the projector 1 includes an illumination device 100, a color separation optical system 200, liquid crystal light valves 400R, 400G, and 400B as a light modulator, a cross dichroic prism 500 as a color combining optical device, and a projection optical device 600. Although not shown in the drawing, the projector 1 includes, in addition to the optical system described above, a control unit that controls the operation of the projector 1, a power source device that supplies power to the illumination device 100 and the control unit, a cooling device that cools the liquid crystal light valves 400R, 400G, and 400B and the power source device, and an external housing that accommodates these devices therein.

The illumination device 100 includes a light source device 10, a condensing optical system 20, a wavelength conversion element 40 including a phosphor 42, a collimating optical system 60, lens arrays 120 and 130, a polarization conversion element 140, and a superimposing lens 150.

The light source device 10 includes a base material 7, a plurality of light-emitting elements 8 disposed on the base material 7, and a plurality of collimating lenses 9 disposed on the light-exiting side of the light-emitting elements 8, all of which will be described in detail later.

The light-emitting element 8 of the embodiment is a semiconductor laser, which emits light (e.g., blue light) for exciting the phosphor 42. The collimating lens 9 collimates the light emitted from the light-emitting element 8.

The condensing optical system 20 concentrates the light emitted from the light source device 10.

The wavelength conversion element 40 includes a circular plate 41, the phosphor 42 provided in the circumferential direction on the circular plate 41, and a motor 43 that rotates the circular plate 41.

The circular plate 41 is formed of a member that transmits the light emitted from the light-emitting element 8, for example, silica glass, quartz crystal, sapphire, or the like.

The phosphor 42 is provided on the circular plate 41 on the side opposite to the condensing optical system 20, and is disposed so as to overlap the focal position of the light concentrated by the condensing optical system 20. The phosphor 42 transmits a portion of the light (blue light) emitted from the light source device 10 while absorbing the remaining portion of the light to emit visible light (in the embodiment, yellow light). The light emitted from the phosphor 42 constitutes white light composed of the blue light and yellow light combined together.

The collimating optical system 60 includes a first lens 62 that suppresses the spread of light emitted from the phosphor 42, and a second lens 64 that collimates the light incident through the first lens 62. Overall, the collimating optical system 60 collimates the light emitted from the phosphor 42.

The lens array 120 has a configuration including small lenses arranged in a matrix, and divides the light emitted from the collimating optical system 60 into a plurality of partial lights. The lens array 130 has a configuration substantially similar to the lens array 120, and substantially superimposes, together with the superimposing lens 150, the partial lights on the surfaces of the liquid crystal light valves 400R, 400G, and 400B. The polarization conversion element 140 converts unpolarized light emitted from the lens array 130 to linearly polarized light that can be used by the liquid crystal light valves 400R, 400G, and 400B.

The color separation optical system 200 includes dichroic mirrors 210 and 220, mirrors 230, 240, and 250, field lenses 300R, 300G, and 300B, and relay lenses 260 and 270.

In the light L emitted from the illumination device 100, the dichroic mirror 210 reflects green light (G-light) and blue light (B-light) while transmitting red light (R-light). In the lights reflected by the dichroic mirror 210, the dichroic mirror 220 reflects the G-light while transmitting the B-light.

The R-light transmitted through the dichroic mirror 210 is reflected by the mirror 230 and collimated by the field lens 300R, and then incident on the liquid crystal light valve 400R. The G-light reflected by the dichroic mirror 210 is collimated by the field lens 300G, and then incident on the liquid crystal light valve 400G. The B-light transmitted through the dichroic mirror 220 passes through the relay lens 260 and is reflected by the mirror 240. Thereafter, the B-light passes through the relay lens 270, is reflected by the mirror 250, and is incident on the field lens 300B. The B-light incident on the field lens 300B is collimated, and then incident on the liquid crystal light valve 400B.

The liquid crystal light valves 400R, 400G, and 400B are, for example, transmissive liquid crystal light valves, and connected to the control unit through cables (not shown). The liquid crystal light valves 400R, 400G, and 400B modulate, based on image signals supplied thereto, the respective colored lights emitted from the color separation optical system 200, and form image lights of the respective colors.

The cross dichroic prism 500 has a substantially square shape, in a plan view, with four right-angle prisms bonded together, and two dielectric multilayer films are formed at an interface where the right-angle prisms are bonded together. The cross dichroic prism 500 reflects the R-light and the B-light modulated by the liquid crystal light valves 400R and 400B, respectively, while transmitting the G-light modulated by the liquid crystal light valve 400G, to combine the image lights of the three colors.

The projection optical device 600 is configured to include a plurality of lenses (not shown), and enlarges and projects the light combined by the cross dichroic prism 500 onto a projection surface SCR.

Configuration of Light Source Device

Here, the light source device 10 will be described in detail.

Figure 2:
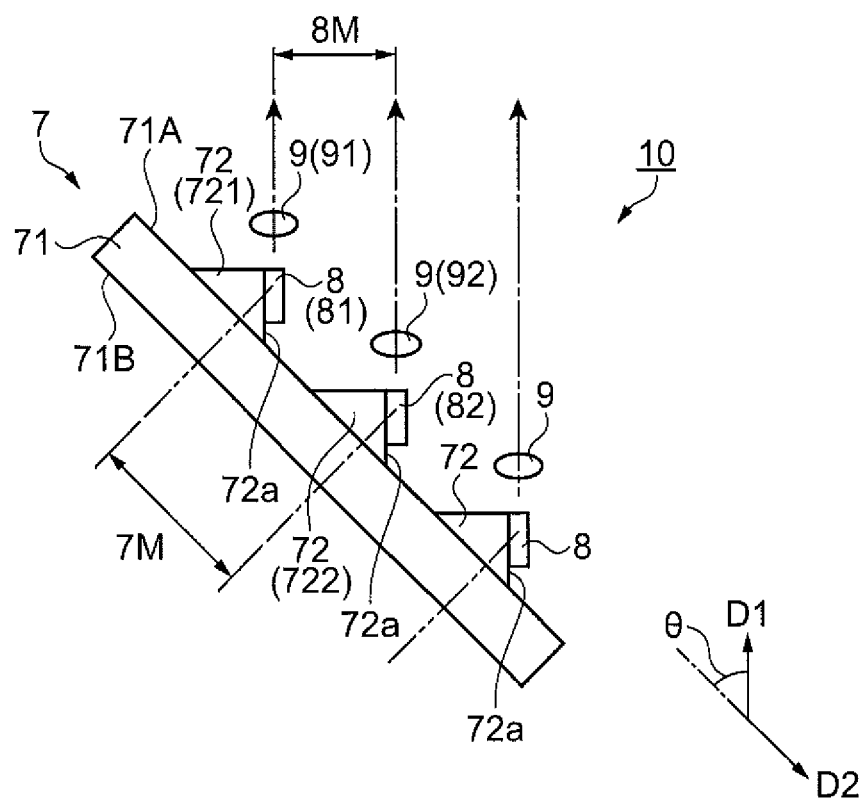
FIG. 2 is a side view schematically showing a light source device of the first embodiment.

FIG. 2 is a side view schematically showing the light source device 10.

As described above, the light source device 10 includes the base material 7, the plurality of light-emitting elements 8, and the plurality of collimating lenses 9. As shown in FIG. 2, each of the plurality of light-emitting elements 8 is disposed so as to emit light in a first direction D1.

The base material 7 is formed of a material such as copper or Kovar, and includes a base portion 71 and a plurality of projecting portions 72 including a first projecting portion 721 and a second projecting portion 722 that project from one side of the base portion 71.

The base portion 71 extends in a second direction D2 inclined with respect to the first direction D1, and includes a first surface 71A on the one side and a second surface 71B on the other side which is the side opposite to the first surface 71A. The base portion 71 may have a wedge shape in which the thickness on one end side is different from the thickness on the other end side, to say nothing of a shape in which the first surface 71A and the second surface 71B are parallel to the second direction D2 (a shape in which the thickness in a direction orthogonal to the second direction D2 is uniform), as long as the shape extends in the second direction D2 as a whole. Moreover, the first surface 71A or the second surface 71B may have irregularities.

As shown in FIG. 2, the plurality of projecting portions 72 project from the first surface 71A, the one side of the base portion 71, and are provided along the second direction D2. Each of the projecting portions 72 is formed into a triangular shape in a side view, and includes a arrangement surface 72a that is parallel to the first direction D1 and on which the light-emitting element 8 is disposed. Moreover, although not shown in the drawing, each of the projecting portions 72 extends in a third direction parallel to the first surface 71A and orthogonal to the second direction D2, and a plurality of light-emitting elements 8 can be disposed on each of the arrangement surfaces 72a.

The plurality of light-emitting elements 8 includes a first light-emitting element 81 and a second light-emitting element 82. In the plurality of light-emitting elements 8, the first light-emitting element 81 and the second light-emitting element 82 are next to each other in the second direction D2. A plurality of the first light-emitting elements 81 are provided on the arrangement surface 72a of the first projecting portion 721; and a plurality of the second light-emitting elements 82 are provided on the arrangement surface 72a of the second projecting portion 722. In this manner, the plurality of light-emitting elements 8 are disposed in a matrix along the second direction and the third direction on the first surface 71A side of the base portion 71.

The plurality of collimating lenses 9 are provided individually corresponding to the plurality of light-emitting elements 8. The plurality of collimating lenses 9 include first collimating lenses 91 disposed on the light-exiting side of the first light-emitting elements 81 and second collimating lenses 92 disposed on the light-exiting side of the second light-emitting elements 82. In this manner, the plurality of collimating lenses 9 are disposed in a matrix along the second direction and the third direction similarly to the plurality of light-emitting elements 8. Then, one collimating lens 9 collimates the light emitted from the corresponding light-emitting element 8. Moreover, in the plurality of collimating lenses 9, a plurality of collimating lenses 9 that are next to each other in the third direction are configured as a lens array in which the collimating lenses 9 next to each other are bonded together, although not shown in the drawing.

The second direction D2 is inclined with respect to the first direction D1 which means that an angle (inclination angle θ (see FIG. 2)) formed by the first direction D1 and the second direction D2 is larger than 0° and smaller than 90°.

As shown in FIG. 2, an interval in the second direction D2 between the first light-emitting element 81 and the second light-emitting element 82 is defined as 7M, and an interval in a direction perpendicular to the first direction D1 between a principal ray of a light beam emitted from the first light-emitting element 81 and a principal ray of a light beam emitted from the second light-emitting element 82 is defined as 8M. By setting the inclination angle θ to be smaller than 90°, the interval 8M can be made smaller than the interval 7M. That is, a arrangement density ρ2 of the plurality of light-emitting elements 8 on the base portion 71 can be made lower than a density ρ1 of a plurality of light beams emitted from the plurality of light-emitting elements 8 in a cross-section perpendicular to the first direction D1. Due to this, the heat generated by the plurality of light-emitting elements 8 can be efficiently discharged through the base material 7.

The smaller the inclination angle θ is, the larger the difference between the density ρ1 and the arrangement density ρ2 is, so that the inclination angle θ is preferably 45° or less. However, when the inclination angle θ is too small, the light emitted from the second light-emitting element 82 interferes with the first collimating lens 91 corresponding to the first light-emitting element 81. Therefore, it is necessary to set the inclination angle so as not to cause the interference.

As has been described above, according to the embodiment, the following advantageous effects can be obtained.

(1) The light source device 10 includes the plurality of light-emitting elements 8, and therefore can emit light of high luminance.

Moreover, in the light source device 10, since the arrangement density of the plurality of light-emitting elements 8, that is, the arrangement density of heat-generating portions is lower than the density of the plurality of light beams emitted from the plurality of light-emitting elements 8, the heat generated by the plurality of light-emitting elements 8 can be efficiently dissipated through the base material 7. Thus, it is possible to provide the light source device 10 whose temperature rise is reduced and whose lifetime is increased.

(2) Since the temperature rise of the light source device 10 is reduced, the arrangement density of the plurality of light-emitting elements 8 can be increased. Thus, it is possible to miniaturize the light source device 10.

(3) Since the plurality of projecting portions 72 each including the arrangement surface 72a are provided on the one side of the base material 7, it is possible to easily realize a configuration in which the plurality of light-emitting elements 8 are disposed along the second direction D2 and each of the light-emitting elements 8 emits light in the first direction D1.

(4) Since the light source device 10 includes the plurality of collimating lenses 9 individually corresponding to the plurality of light-emitting elements 8, the light emitted by each of the light-emitting elements 8 can be effectively used and emitted to the condensing optical system 20.

(5) Since the illumination device 100 includes the light source device 10, it is possible to illuminate the liquid crystal light valves 400R, 400G, and 400B with high luminance over a long period of time or to miniaturize the illumination device.

(6) Since the projector 1 includes the light source device 10, it is possible to stably project a bright image or to miniaturize the projector.

Second Embodiment

Hereinafter, a light source device according to a second embodiment will be described with reference to the drawings. In the following description, components similar to those of the first embodiment are denoted by the same reference and numeral signs, and a detailed description thereof is omitted or simplified.

Figure 3:
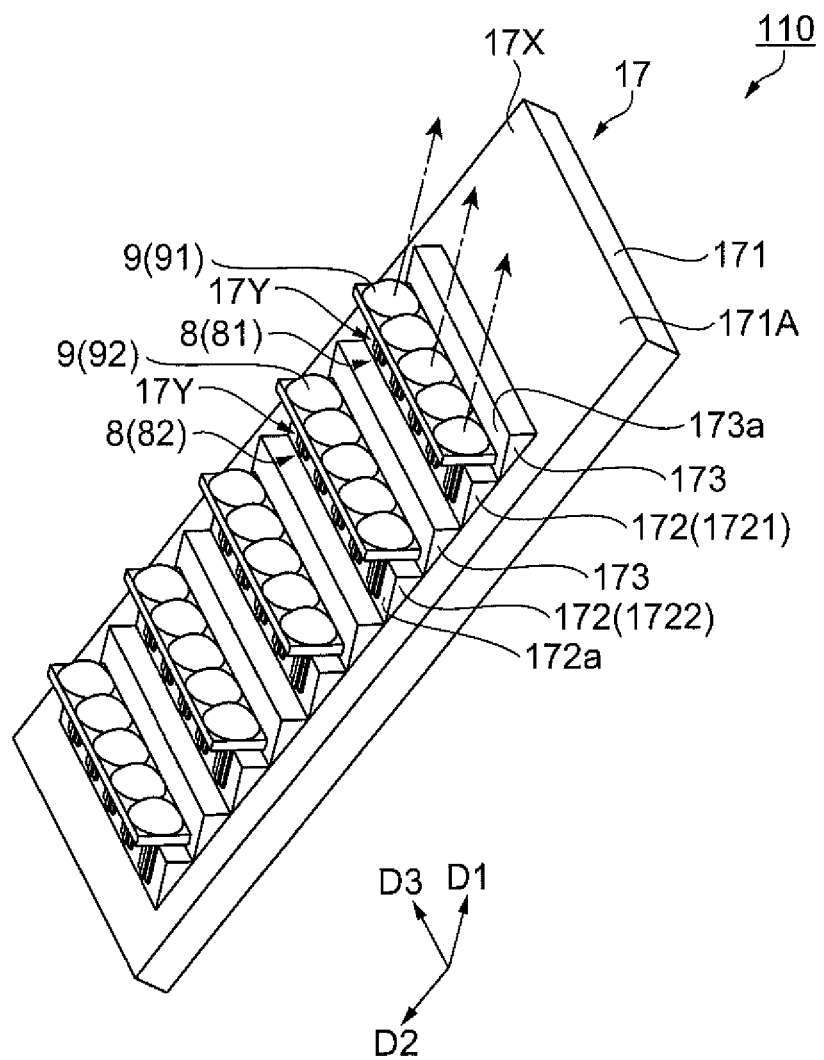
FIG. 3 is a perspective view of a light source device of a second embodiment.
Figure 4:
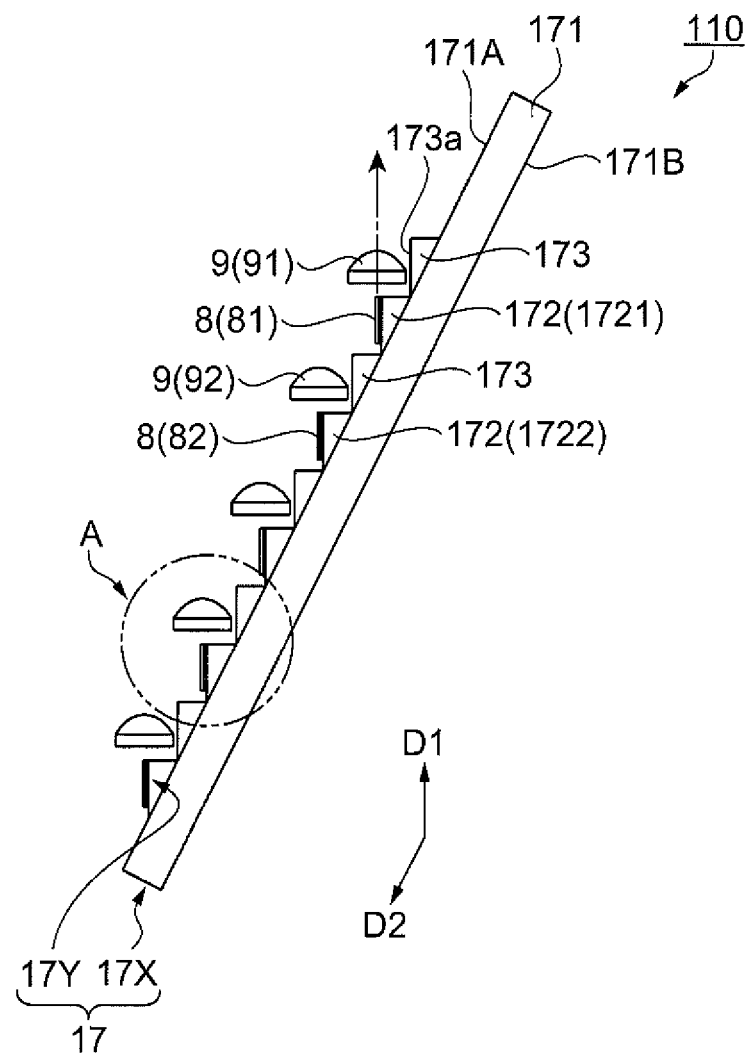
FIG. 4 is a side view of the light source device of the second embodiment.
Figure 5:
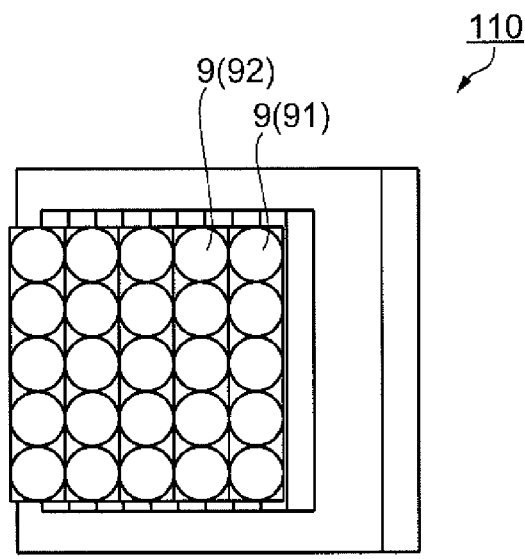
FIG. 5 is a plan view of the light source device of the second embodiment, as viewed in a direction along a first direction.

FIG. 3 is a perspective view of the light source device 110 of the embodiment. FIG. 4 is a side view of the light source device 110 of the embodiment. FIG. 5 is a plan view of the light source device 110 of the embodiment, as viewed in a direction along the first direction D1.

As shown in FIGS. 3 and 4, the light source device 110 of the embodiment includes a base material 17 different from the base material 7 of the first embodiment.

As shown in FIGS. 3 and 4, the base material 17 includes a base material main body 17X and a plurality of temperature buffer members 17Y.

The base material main body 17X includes a base portion 171 similar to the base portion 71 of the first embodiment and a plurality of projecting portions 172 similar to the plurality of projecting portions 72, and includes a plurality of restricting portions 173 not included in the base material 7 of the first embodiment.

The base portion 171 extends in the second direction D2 inclined with respect to the first direction D1, and includes a first surface 171A and a second surface 171B.

The plurality of projecting portions 172 include a first projecting portion 1721 and a second projecting portion 1722, and are provided along the second direction D2 on the first surface 171A side of the base portion 171. As shown in FIG. 3, each of the projecting portions 172 extends in the third direction D3 parallel to the first surface 171A and orthogonal to the second direction D2.

Figure 6:
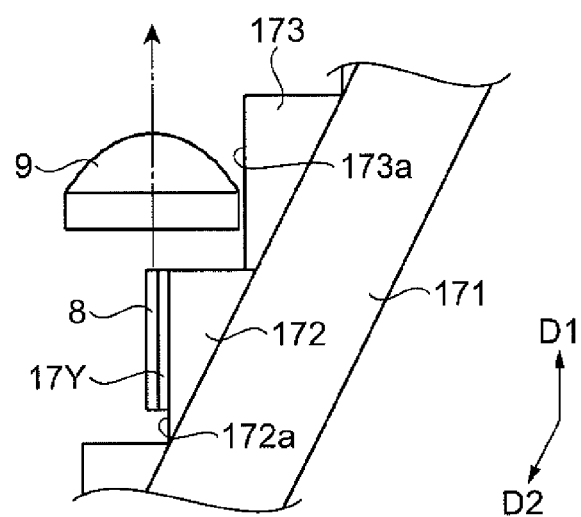
FIG. 6 is an enlarged view of a portion A in FIG. 4.

FIG. 6 is an enlarged view of a portion A in FIG. 4.

As shown in FIG. 6, the projecting portion 172 includes a arrangement surface 172a parallel to the first direction D1.

As shown in FIGS. 3 and 4, the plurality of restricting portions 173 project from the first surface 171A similarly to the projecting portion 172, and are formed alternately with the projecting portion 172 along the second direction D2. Each of the restricting portions 173 extends in the third direction D3 similarly to the projecting portion 172, and includes an edge surface 173a along the first direction D1. Each of the edge surfaces 173a is set so as to restrict the movement of the collimating lens 9 to the base portion 171 side.

The temperature buffer member 17Y is disposed between the base material main body 17X and the light-emitting element 8. Specifically, the temperature buffer member 17Y is disposed between the arrangement surface 172a and the light-emitting element 8. The temperature buffer member 17Y has a thermal expansion coefficient between the thermal expansion coefficient of the light-emitting element 8 and the thermal expansion coefficient of the projecting portion 172. As the temperature buffer member 17Y, when, for example, the light-emitting element 8 having a thermal expansion coefficient of about $3.17 \times 10^{-6}$/K and the projecting portion 172 made of copper (a thermal expansion coefficient of about $16.6 \times 10^{-6}$/K) are used, aluminum nitride (a thermal expansion coefficient of about $4.6 \times 10^{-6}$/K) or the like can be used.

As shown in FIG. 3, a plurality of temperature buffer members 17Y are provided on the arrangement surface 172a of one projecting portion 172. It is sufficient for the base material 17 that the base material main body 17X forms at least the other side (the second surface 171B side) of the base portion 171 and that the temperature buffer member 17Y is disposed between the arrangement surface 172a and the plurality of light-emitting elements 8. For example, the plurality of temperature buffer members 17Y provided on one arrangement surface 172a may be integrally formed.

As shown in FIG. 6, each of the light-emitting elements 8 is disposed on the temperature buffer member 17Y, and the plurality of light-emitting elements 8 are disposed in a matrix along the second direction D2 and the third direction.

The plurality of collimating lenses 9 are provided individually corresponding to the plurality of light-emitting elements 8, and disposed in a matrix as shown in FIG. 5.

A lens array in which a plurality of collimating lenses are disposed along the third direction D3 and the collimating lenses next to each other are bonded together is disposed on the edge surface 173a, as shown in FIG. 6, so that the movement of the lens array to the base portion 171 side is restricted by the edge surface 173a.

As has been described above, according to the light source device 110 of the embodiment, the following advantageous effects can be obtained.

(1) The base portion 171 is provided with the restricting portion 173 restricting the movement of the collimating lens 9 to the base portion 171 side. Due to this, since the collimating lens 9 can be easily disposed at a predetermined position in one direction of the directions orthogonal to the first direction D1, the manufacture of the light source device 110 can be simplified.

(2) The base material 17 includes the base material main body 17X and the temperature buffer member 17Y disposed between the base material main body 17X and the light-emitting element 8. The temperature buffer member 17Y has a thermal expansion coefficient between the thermal expansion coefficient of the light-emitting element 8 and the thermal expansion coefficient of the projecting portion 172. Due to this, even when the base material main body 17X is formed of a member having a high thermal conductivity, that is, a member having a favorable heat-dissipating property, a stress between the light-emitting element 8 and the projecting portion 172 due to a change in shape caused by heat generation can be relaxed. Thus, the light-emitting element 8 can be stably disposed on the base material 17.

Third Embodiment

Hereinafter, a light source device according to a third embodiment will be described with reference to the drawing.

In the following description, components similar to those of the first embodiment are denoted by the same reference and numeral signs, and a detailed description thereof is omitted or simplified.

Figure 7:
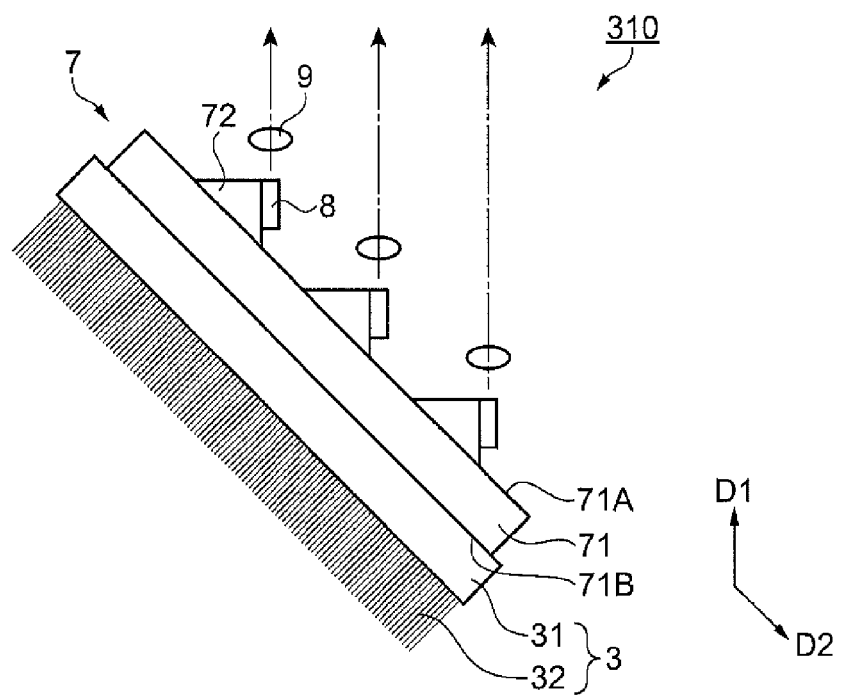
FIG. 7 is a side view schematically showing a light source device of a third embodiment.

FIG. 7 is a side view schematically showing the light source device 310 of the embodiment.

As shown in FIG. 7, the light source device 310 of the embodiment includes a heat sink 3 as a heat-receiving portion not included in the light source device 10 of the first embodiment.

The heat sink 3 is formed of, for example, a material such as aluminum, disposed on the other side (the second surface 71B) of the base portion 71, which is the side opposite to the one side (the first surface 71A) on which the projecting portion 72 is provided, and receives the heat of the base portion 71. The heat sink 3 includes a base plate 31 having a rectangular shape in a plan view, and a plurality of fin portions 32. The base plate 31 is attached to the second surface 71B as a heat-dissipating surface so as to be in contact therewith. Grease or the like having a favorable heat-conducting property may intervene between the second surface 71B and the base plate 31.

The plurality of fin portions 32 are erected from the base plate 31 to the side opposite to the base portion 71.

The heat sink 3 receives the heat conducted from the plurality of light-emitting elements 8 to the base portion 71, and dissipates the heat.

Moreover, it is preferable for the base portion 71 that the first surface 71A and the second surface 71B are formed parallel to the second direction D2. Due to this, since the heat is approximately equally conducted from the light-emitting elements 8 to the heat sink 3, the temperature rise of the light-emitting elements 8 is reduced with a small variation.

Here, exemplary temperature simulation results in association with the light emission of the light-emitting elements 8 in the light source device 310 including the heat sink 3 will be described in comparison with a light source device X having a configuration (an inclination angle θ of 90°; not shown) in which the base portion 71 is not inclined, which is different from the configuration of the embodiment.

In the light source devices 310 and X used in the simulation, a plurality of light-emitting elements 8 whose heat generation amount is 8.5 W are disposed in a 5 by 5 matrix as viewed in the first direction D1. Moreover, in a cross-section perpendicular to the first direction D1, a principal ray of each of a plurality of light beams emitted from the plurality of light-emitting elements 8 is distributed in a rectangular area of 100 mm². Moreover, the base portion 71 is formed such that the first surface 71A and the second surface 71B are parallel to the second direction D2.

In the simulation results, a temperature Tx of the light source device X at an ambient temperature of 25 degrees was about 150° C.

On the other hand, a temperature Ta of the light source device 310 of the embodiment at an ambient temperature of 25 degrees was about 118° C. when the inclination angle θ was about 27°, while the temperature Ta was about 114° C. when the inclination angle θ was about 18°. That is, a temperature reduction rate $\Delta T (=(1-(Ta-25)/(Tx-25)) \times 100)$ of the light source device 310 with respect to the light source device X is about 25% when the inclination angle θ is about 27°, while the temperature reduction rate ΔT is about 30% when the inclination angle θ is about 18°. If the projector 1 is configured to include a blower fan that sends air to the heat sink 3, a heat-dissipating effect becomes more remarkable, and therefore, the temperature of the light source device 310 can be further reduced.

As has been described above, according to the light source device 310 of the embodiment, the following advantageous effects can be obtained.

(1) Since the heat sink 3 is disposed on the side of the base portion 71 opposite to the side where the plurality of light-emitting elements 8 are disposed, the light source device 310 can efficiently dissipate the heat generated by the plurality of light-emitting elements 8 and conducted to the base portion 71. Thus, it is possible to provide the light source device 310 whose temperature rise is further reduced and whose degradation is suppressed. Moreover, the plurality of light-emitting elements 8 can be disposed at a higher density. Further, it is possible to provide the light source device 310 in which the light-emitting elements 8 emitting light of higher luminance is mounted.

(2) When the first surface 71A and the second surface 71B of the base portion 71 are formed parallel to the second direction D2, the light-emitting elements 8 disposed along the second direction D2 are located at approximately the same distance to the second surface 71B (heat-dissipating surface). Due to this, since the heat is approximately equally conducted from the light-emitting elements 8 to the heat sink 3, the temperature rise of the light-emitting elements 8 can be reduced with a small variation. Thus, it is possible to provide the light source device 310 whose degradation is further suppressed.

Fourth Embodiment

Hereinafter, a light source device and a projector according to a fourth embodiment will be described with reference to the drawing. In the following description, components similar to those of the first embodiment are denoted by the same reference and numeral signs, and a detailed description thereof is omitted or simplified.

Figure 8:
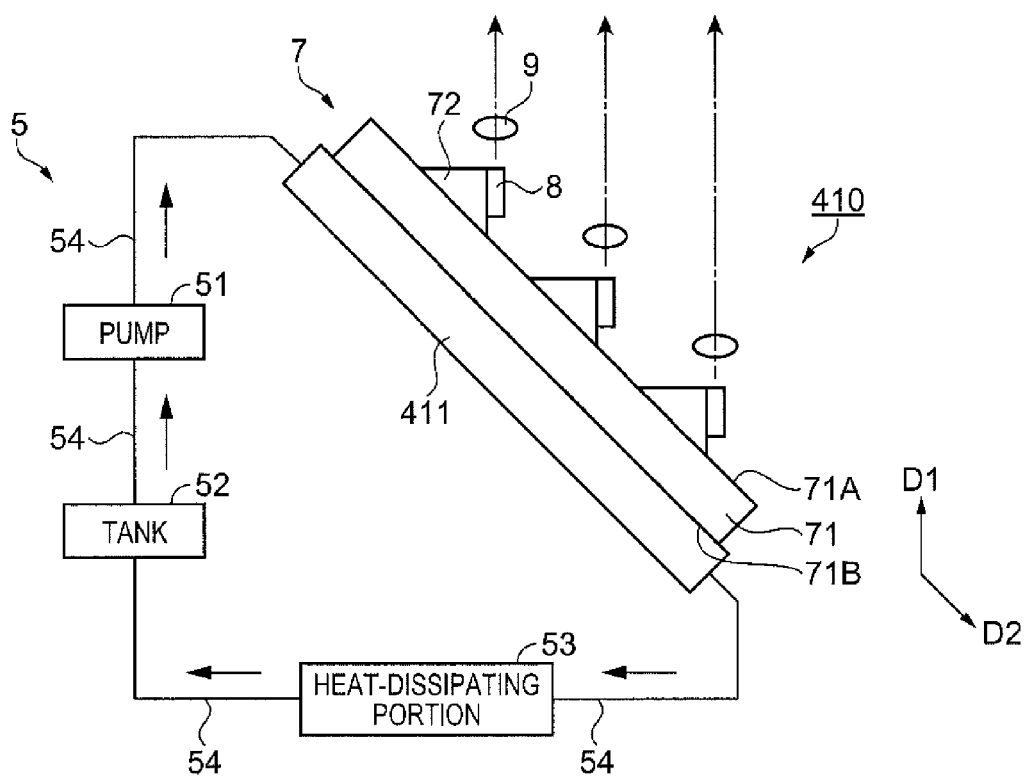
FIG. 8 is a diagram showing a light source device of a fourth embodiment, and a configuration of a cooling device connected to the light source device.

FIG. 8 is a diagram showing the light source device 410 of the embodiment, and a configuration of a cooling device 5 connected to the light source device 410.

As shown in FIG. 8, the light source device 410 of the embodiment includes a heat exchanger 411 as a heat-receiving portion not included in the light source device 10 of the first embodiment, and the projector of the embodiment includes the cooling device 5 connected to the heat exchanger 411.

The heat exchanger 411 has a substantially rectangular parallelepiped external shape, and is provided with, in the interior thereof, a plurality of tiny channels (not shown) through which a liquid flows, and an inlet port and an outlet port (both not shown) that are in communication with the channels. The liquid flowing through the heat exchanger 411 may include, by way of example, water and propylene glycol. As shown in FIG. 8, the heat exchanger 411 is disposed on the second surface 71B of the base portion 71, and conducts the heat of the base portion 71 to the liquid flowing through the heat exchanger 411.

As shown in FIG. 8, the cooling device 5 includes a pump 51, a tank 52, a heat-dissipating portion 53, and a plurality of flow tubes 54. The cooling device 5 forms, together with the heat exchanger 411, an annular channel through which the liquid circulates.

The pump 51 is connected with the tank 52 and the inlet port of the heat exchanger 411 through two flow tubes 54, and circulates the liquid along the annular channel. Specifically, the liquid sent from the pump 51 circulates sequentially through the heat exchanger 411, the heat-dissipating portion 53, the tank 52, and the pump 51.

The tank 52 is connected with the pump 51 and the heat-dissipating portion 53 through two flow tubes 54. The tank 52 stores a liquid, and supplies this liquid to the annular channel.

Although not described in detail herein, the heat-dissipating portion 53 includes a heat-absorbing portion, a thermoelectric conversion element such as a Peltier element, and a heat sink, and is connected with the tank 52 and the outlet port of the heat exchanger 411 through two flow tubes 54. The heat-absorbing portion absorbs the heat conducted to the liquid in the heat exchanger 411, and conducts the heat to the heat sink through the thermoelectric conversion element. In this manner, the heat generated by the light-emitting element 8 is discharged from the heat-dissipating portion 53.

In this manner, the light source device 410 includes the heat exchanger 411, and is cooled by the cooling device 5 using a liquid.

As has been described above, according to the light source device 410 of the embodiment, the following advantageous effects can be obtained.

(1) The light source device 410 includes the heat exchanger 411 through which a liquid flows, and therefore is further efficiently cooled. Due to this, it is possible to provide the light source device 410 in which a more number of light-emitting elements 8 are mounted and which emits light of much higher luminance.

(2) The cooling device 5 has a configuration in which a connection to the heat exchanger 411 and connections between the devices (the pump 51, the tank 52, and the heat-dissipating portion 53) are made through the plurality of flow tubes 54, so that the freedom of arrangement of the cooling device 5 is high. Accordingly, the arrangement effectively using, not only a space in the vicinity of the light source device 410, but also a space in the projector is possible. Thus, it is possible to provide the projector that can be miniaturized.

Fifth Embodiment

Hereinafter, a light source device according to a fifth embodiment will be described with reference to the drawing. In the following description, components similar to those of the first embodiment are denoted by the same reference and numeral signs, and a detailed description thereof is omitted or simplified.

Although the light source device 10 of the first embodiment uses a semiconductor laser as the light-emitting element 8, the light source device 510 of the embodiment uses a light-emitting diode (LED) as a light-emitting element 18.

Figure 9:
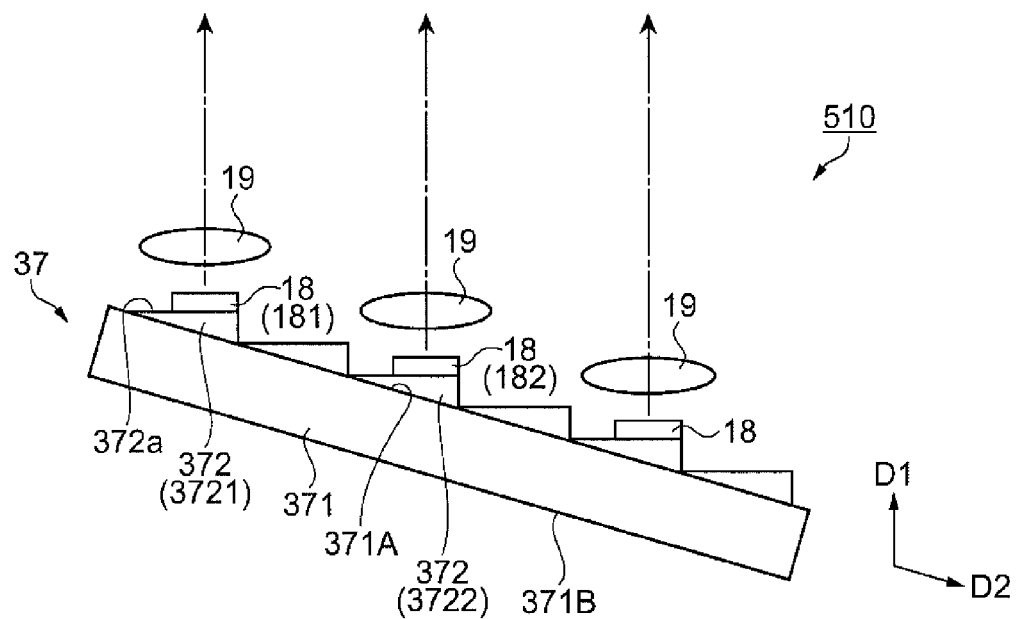
FIG. 9 is a side view schematically showing a light source device of a fifth embodiment.

FIG. 9 is a side view schematically showing the light source device 510 of the embodiment.

As shown in FIG. 9, the light source device 510 includes a base material 37, a plurality of light-emitting elements 18 that emit light in the first direction D1, and a plurality of collimating lenses 19.

As shown in FIG. 9, the base material 37 includes a base portion 371 extending in the second direction D2 inclined with respect to the first direction D1, and a plurality of projecting portions 372 including a first projecting portion 3721 and a second projecting portion 3722 that project from one side (a first surface 371A side) of the base portion 371.

As shown in FIG. 9, the plurality of projecting portions 372 are provided along the second direction D2, and each formed into a triangular shape in a side view. Each of the projecting portions 372 includes a arrangement surface 372a that is orthogonal to the first direction D1 and on which the light-emitting element 18 is disposed. Moreover, although not shown in the drawing, each of the projecting portions 372 extends in the third direction parallel to the first surface 371A and orthogonal to the second direction D2. A plurality of light-emitting elements 18 can be disposed on each of the arrangement surfaces 372a.

The plurality of light-emitting elements 18 include a first light-emitting element 181 and a second light-emitting element 182. A plurality of first light-emitting elements 181 are disposed on the arrangement surface 372a of the first projecting portion 3721, while a plurality of second light-emitting elements 182 are disposed on the arrangement surface 372a of the second projecting portion 3722. In this manner, the plurality of light-emitting elements 18 are disposed in a matrix along the second direction and the third direction.

As the light-emitting element 18, an LED that emits light (e.g., blue light, ultraviolet light, etc.) exciting a phosphor, or an LED that emits colored light (e.g., red light, green light, blue light, etc.) illuminating an object to be illuminated, can be used.

The plurality of collimating lenses 19 are provided individually corresponding to the plurality of light-emitting elements 18.

As has been described above, according to the light source device 510 of the embodiment, advantageous effects similar to those of the light source device 10 of the first embodiment can be obtained.

Modified Example

The embodiments may be modified as follows.

Figure 10:
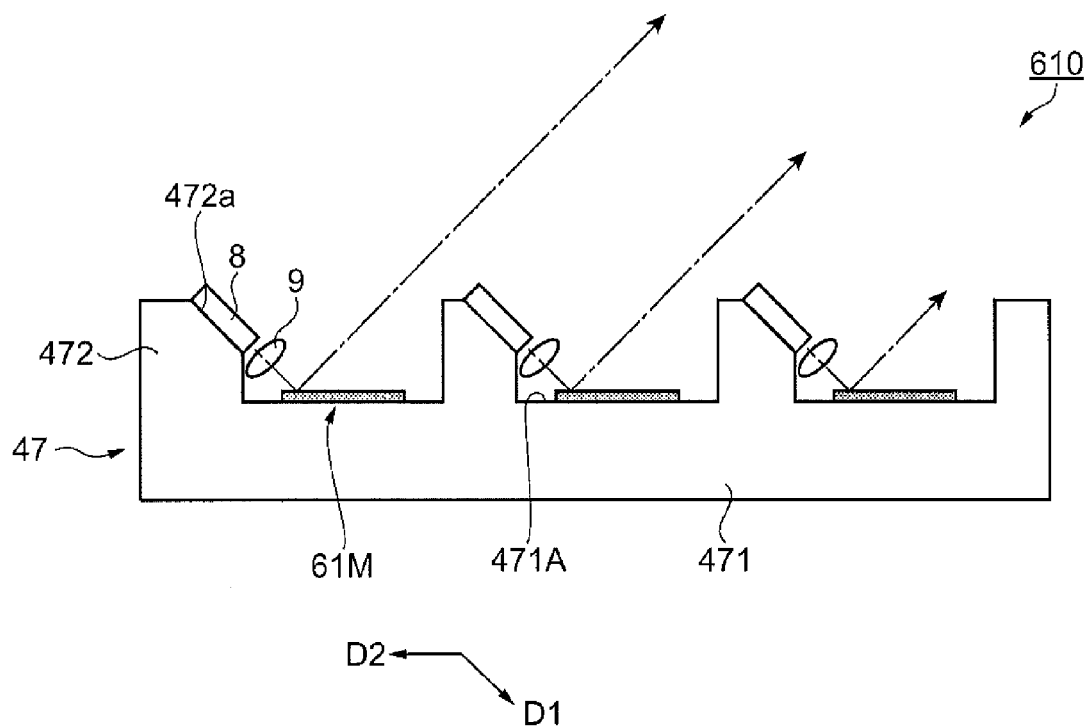
FIG. 10 is a schematic view showing a light source device of a modified example.

FIG. 10 is a schematic view of a light source device 610 of a modified example.

As shown in FIG. 10, the light source device 610 includes a base material 47, the plurality of light-emitting elements 8, the plurality of collimating lenses 9, and in addition, a plurality of mirrors 61M. The light source device 610 is configured such that the direction of light emitted from the light-emitting element 8 can be changed by the mirror 61M.

As shown in FIG. 10, the base material 47 includes a base portion 471, and a plurality of projecting portions 472 projecting from a first surface 471A of the base portion 471 and provided along the second direction D2.

Each of the mirrors 61M is provided between the projecting portions 472 next to each other on the first surface 471A. In the modified example, a reflective surface of the mirror 61M is parallel to the first surface 471A; however, the reflective surface may not necessarily be parallel thereto.

On the projecting portion 472, a arrangement surface 472a that is inclined with respect to the second direction and on which the light-emitting element 8 is disposed is formed at a corner portion on the side where the mirror 61M is disposed.

The light-emitting element 8 is disposed on the arrangement surface 472a, and emits light in the first direction D1 toward the mirror 61M (the first surface 471A). That is, the base portion 471 extends in the second direction inclined with respect to the first direction D1.

The collimating lens 9 is disposed between the light-emitting element 8 and the mirror 61M.

Also in this modified example, as shown in FIG. 10, the arrangement density of the plurality of light-emitting elements 8, that is, the arrangement density of heat-generating portions is lower than the density of a plurality of ray bundles emitted from the plurality of light-emitting elements 8. Therefore, it is possible to provide the light source device 610 whose temperature rise is reduced while the direction of light emitted by the light-emitting element 8 is changed.

A heat pipe may be used as a heat-receiving portion disposed on the second surface 71B side of the base portion 71. The heat pipe contains a working fluid therein, and is connected at a first end to the base portion 71 and at a second end to, for example, a heat sink. The heat pipe receives at the first end the heat of the base portion 71, and moves the heat to the second end by circulating the working fluid. Then, the heat moved to the second end is dissipated by the heat sink.

Although the light source device 10 of the embodiment described above includes the light-emitting element 8 emitting blue light, a light source device including a light-emitting element that emits light in other wavelength band, for example ultraviolet light, without limiting to blue light, may be configured.

Moreover, although the illumination device 100 of the embodiment described above includes the phosphor 42 emitting yellow light, an illumination device including a phosphor that emits other visible light, without limiting to yellow light, may be configured.

An illumination device including a first light source device using a semiconductor laser as a light-emitting element and a second light source device using an LED as a light-emitting element may be configured as an illumination device for a projector. For example, the following mode is possible. A phosphor is caused to emit yellow light with ultraviolet light emitted by the first light source device. This yellow light is separated into the R-light and the G-light to illuminate the liquid crystal light valves 400R and 400G, respectively, while the liquid crystal light valve 400B is illuminated by the B-light emitted by the light source device 510.

The projector 1 of the embodiment described above uses, as a light modulator, the transmissive liquid crystal light valves 400R, 400G, and 400B. However, a projector using a reflective liquid crystal light valve may also be employed. Moreover, a projector using, as a light modulator, a micromirror-type light modulator, for example, a digital micromirror device (DMD) or the like may also be employed.

The light modulator of the embodiment described above employs a so-called three-plate system using three light modulators corresponding to the R-light, the G-light, and the B-light. However, the light modulator is not limited to this, and may employ a single-plate system. Alternatively, the invention can be applied also to a projector including two or four or more light modulators.

Although an example in which the light source device according to the invention is mounted in a projector has been shown in the embodiments, the invention is not limited to this example. The light source device according to the invention can be applied also to a luminaire, a headlight of an automobile, or the like.

The entire disclosure of Japanese Patent Application No. 2015-141929, filed on Jul. 16, 2015 is expressly incorporated by reference herein.

What is claimed is:

1. A light source device comprising:
    a plurality of light-emitting elements including a first light-emitting element and a second light-emitting element each of which emits light in a first direction; and
    a base material including a base portion that extends in a second direction inclined with respect to the first direction, wherein the plurality of light-emitting elements are disposed along the second direction on one side of the base portion, the base material includes a plurality of projecting portions including a first projecting portion and a second projecting portion that project from the one side of the base portion, and each projecting portion has first and second surfaces which both intersect the one side of the base portion at non-perpendicular angles.

2. The light source device according to claim 1, wherein the first light-emitting element is provided on the first projecting portion, and the second light-emitting element is provided on the second projecting portion.

3. The light source device according to claim 1, further comprising a collimating lens that collimates the light emitted by the first light-emitting element.

4. The light source device according to claim 3, wherein the base material further includes a restricting portion that projects from the one side of the base portion and restricts movement of the collimating lens to the base portion side.

5. The light source device according to claim 1, further comprising a heat-receiving portion that is provided on the other side of the base portion and receives heat of the base portion.

6. The light source device according to claim 5, wherein the base portion includes a heat-dissipating surface on which the heat-receiving portion is disposed, and the heat-dissipating surface is parallel to the second direction.

7. The light source device according to claim 1, wherein the base material includes a base material main body and a temperature buffer member that is disposed between the base material main body and the first light-emitting element, and the temperature buffer member has a thermal expansion coefficient between a thermal expansion coefficient of the light-emitting element and a thermal expansion coefficient of the base material main body.

8. An illumination device comprising:
the light source device according to claim 1; and
a phosphor that is excited by light emitted from the light source device and emits visible light.

9. An illumination device comprising:
the light source device according to claim 2; and
a phosphor that is excited by light emitted from the light source device and emits visible light.

10. An illumination device comprising:
the light source device according to claim 3; and
a phosphor that is excited by light emitted from the light source device and emits visible light.

11. An illumination device comprising:
the light source device according to claim 4; and
a phosphor that is excited by light emitted from the light source device and emits visible light.

12. An illumination device comprising:
the light source device according to claim 5; and
a phosphor that is excited by light emitted from the light source device and emits visible light.

13. An illumination device comprising:
the light source device according to claim 6; and
a phosphor that is excited by light emitted from the light source device and emits visible light.

14. A projector comprising:
the light source device according to claim 1;
a light modulator that modulates light emitted from the light source device; and
a projection optical device that projects the light modulated by the light modulator.

15. A projector comprising:
the light source device according to claim 2;
a light modulator that modulates light emitted from the light source device; and
a projection optical device that projects the light modulated by the light modulator.

16. A projector comprising:
the light source device according to claim 3;
a light modulator that modulates light emitted from the light source device; and
a projection optical device that projects the light modulated by the light modulator.

17. A projector comprising:
the light source device according to claim 4;
a light modulator that modulates light emitted from the light source device; and
a projection optical device that projects the light modulated by the light modulator.

18. A projector comprising:
the light source device according to claim 5;
a light modulator that modulates light emitted from the light source device; and
a projection optical device that projects the light modulated by the light modulator.

19. A projector comprising:
the light source device according to claim 6;
a light modulator that modulates light emitted from the light source device; and
a projection optical device that projects the light modulated by the light modulator.

20. A projector comprising:
the illumination device according to claim 8;
a light modulator that modulates light emitted from the illumination device; and
a projection optical device that projects the light modulated by the light modulator.

* * * * *